United States Patent
Gong

(10) Patent No.: US 7,464,033 B2
(45) Date of Patent: *Dec. 9, 2008

(54) DECODING MULTIPLE HMM SETS USING A SINGLE SENTENCE GRAMMAR

(75) Inventor: Yifan Gong, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 674 days.

This patent is subject to a terminal disclaimer.

(21) Appl. No.: 11/051,922

(22) Filed: Feb. 4, 2005

(65) Prior Publication Data

US 2005/0187771 A1   Aug. 25, 2005

Related U.S. Application Data

(63) Continuation-in-part of application No. 09/915,911, filed on Jul. 26, 2001, now Pat. No. 7,269,558.

(60) Provisional application No. 60/221,920, filed on Jul. 31, 2000.

(51) Int. Cl.
*G10L 15/14* (2006.01)

(52) U.S. Cl. .................... 704/256.2; 704/256; 704/240; 704/243; 704/255

(58) Field of Classification Search ......... 704/255–257, 704/231–232, 251, 240, 243, 242
See application file for complete search history.

(56) References Cited

U.S. PATENT DOCUMENTS

| | | | | |
|---|---|---|---|---|
| 5,333,275 A * | 7/1994 | Wheatley et al. | ............ | 704/243 |
| 5,806,034 A * | 9/1998 | Naylor et al. | ............... | 704/256 |
| 5,819,221 A * | 10/1998 | Kondo et al. | ................. | 704/255 |
| 6,055,498 A * | 4/2000 | Neumeyer et al. | .......... | 704/246 |
| 6,076,057 A * | 6/2000 | Narayanan et al. | ....... | 704/256.2 |
| 6,226,611 B1 * | 5/2001 | Neumeyer et al. | .......... | 704/246 |
| 6,285,981 B1 * | 9/2001 | Kao | ........................... | 704/256 |
| 6,615,172 B1 * | 9/2003 | Bennett et al. | .............. | 704/257 |
| 6,633,846 B1 * | 10/2003 | Bennett et al. | .............. | 704/257 |
| 6,665,640 B1 * | 12/2003 | Bennett et al. | .............. | 704/257 |
| 7,050,977 B1 * | 5/2006 | Bennett | .................... | 704/270.1 |

* cited by examiner

*Primary Examiner*—Vijay B Chawan
(74) *Attorney, Agent, or Firm*—Wade J. Brady, III; Frederick J. Telecky, Jr.

(57) ABSTRACT

For a given sentence grammar, speech recognizers are often required to decode M sets of HMMs each of which models a specific acoustic environment. In order to match input acoustic observations to each of the environments, typically recognition search methods require a network of M sub-networks. A new speech recognition search method is described here, which needs a network that is only the size of a single sub-network and yet provides the same recognition performance, thus reducing the memory requirements for network storage by (M-1)/M.

8 Claims, 2 Drawing Sheets

DECODING MULTIPLE HMM SETS USING A SINGLE SENTENCE GRAMMAR

CROSS-REFERENCE TO RELATED APPLICATION

This application is a continuation-in-part to application Ser. No. 09/915,911 filed Jul. 26, 2001 now U.S. Pat. No. 7,269,558 of Yifan Gong entitled "Decoding Multiple HMM Sets Using A single Sentence Grammar." This application is incorporated herein by reference. This application claims priority under 35 U.S.C § 119(e) (1) of provisional application No. 60/221,920 filed Jul. 31, 2000 and claims priority under 35 U.S.C. 120 of application Ser. No. 09/915,911 filed Jul. 26, 2001.

FIELD OF INVENTION

This invention relates to speech recognition and more particularly to a speech recognition search method.

BACKGROUND OF INVENTION

Speech recognition devices are typically deployed in different acoustic environments. An acoustic environment refers to a stationary condition in which the speech is produced. For instance, a speech signal may be produced by male speakers, female speakers, child's speech, in an office environment, or in known noisy environments.

A common way of dealing with multiple environment speech recognition is to train sets of models for each environment, wherein the models in a set reflect information about the sounds or words in the context of the environment. Typically present art speech recognizers use Hidden Markov Models (HMMs) as the type of model trained. Each set of HMMs will have the same number of models representing the same sounds or words spoken in the environment corresponding to the HMM set. Typically, a speech recognizer utilizes a grammar network which specifies the sequence of HMMs that correspond to the particular speech sounds and words making up the allowable sentences. In order to handle the sets of HMMs for each environment, current art technology provides the speech recognizer with a large grammar network which contains a grammar sub-network for each HMM set corresponding to each of the environments. These sub-networks enable the use of each of the HMM sets within the recognizer. Since the HMM sequences corresponding to sentences allowed by the grammar network generally do not change with environment, each grammar sub-network has the same structure. For example, a speech recognizer may use a separate set of HMMs for male speakers and a separate set of HMMs for female speakers because the sounds, and thus the set of HMMs, for a male speaker are different from a female speaker. The speech recognizer would then utilize a grammar network that would consist of two separate sub-networks, one for the male HMM set and one for the female HMM set, with each sub-network having the same structure. During speech recognition, HMMs of the male and female environments are used separately but simultaneously using the separate grammar sub-networks to construct and determine high probability paths through the sub-networks based on the input speech. The path going through the environment grammar sub-network that yields the maximum probability is considered as the final recognition result. Such a practice of using multiple HMM sets provides improved recognition performance. For example, with the same number of HMM parameters if separate male/female HMM model sets are not used the Word Error Rate (WER) typically increases by 70%.

More specifically, for a given sentence grammar network, the speech recognizer is required to develop high probability paths for M (the number of environments) sub-networks referencing M sets of HMMs, each of which models a specific acoustic environment. In order to perform acoustic matching with each of the environments, present art recognition search methods (which include state-of-the-art recognizers such as HTK 2.0) typically require a grammar network consisting of M sub-networks, as illustrated in FIG. 1. Requiring M sub-networks makes the recognition device more costly and requires more memory.

SUMMARY OF INVENTION

A new speech recognition search method is described here, wherein the speech recognizer only requires a grammar network having the size of a single sub-network that represents all of the M sub-networks, and yet yields the same recognition performance, thus reducing the memory requirement for grammar network storage by a factor of (M-1)/M. The speech recognition method includes a single generic base environment-independent grammar network specified using a set of environment-independent symbols, and a sets of expanded symbols referencing the models of each of the environment-dependent model sets. During recognition, the new speech recognizer builds recognition paths by expanding the symbols of the base grammar network through a novel conversion function. This conversion function provides, for each of the base grammar network symbols, an enumeration of an expanded set of symbols and the dependent models referenced by the expanded-symbols. The conversion function may also serve to do the inverse. That is, it can provide, for one of the symbols of the expanded set of symbols, the base symbol to which it corresponds.

DESCRIPTION OF PREFERRED EMBODIMENT

Figure 1:
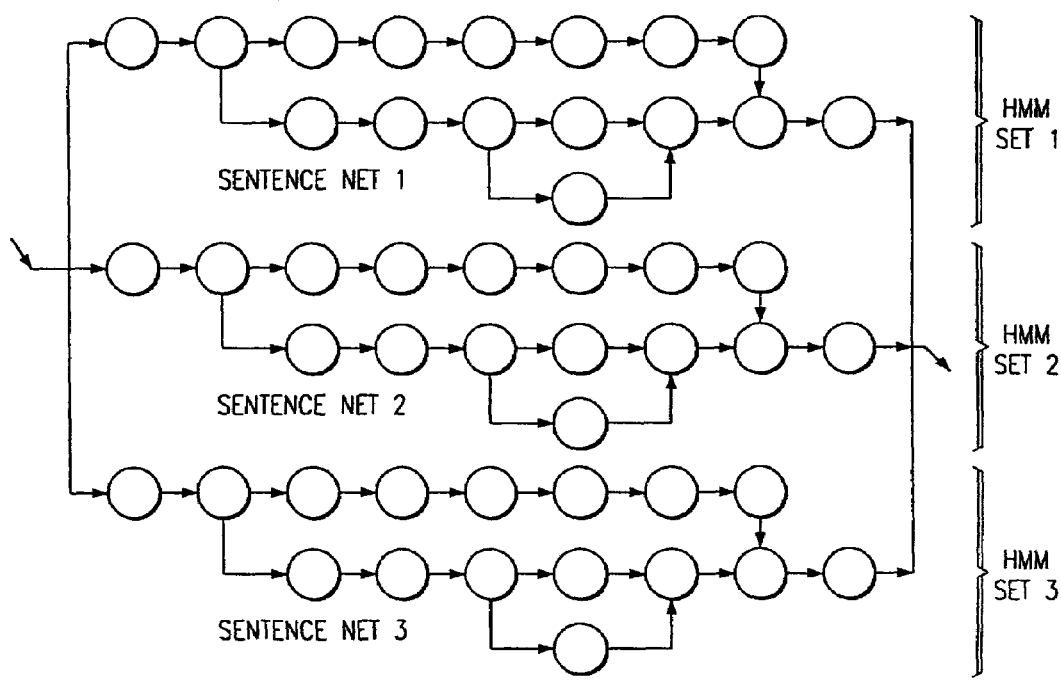
FIG. 1 illustrates a grammar network containing multiple sub-networks needed by present state-of-the-art speech recognizers to recognize multiple environment-dependent model sets.

The preferred embodiment of the present invention uses HMMs, which are well known in the art, as the type of model which contains acoustic information about the sounds and words allowed by the speech recognizer. It should be understood that in the present invention other types or methods of modeling may be used. In the present application we refer to a node in the grammar network describing the allowed sentences as a symbol which references a particular HMM or a group of M HMMs, one from each of the M HMM sets. Transitions between nodes specify the allowed sequences of symbols, and hence the sequence of HMMs. For typical recognizers, when M sets of HMMs are used, then M sub-networks must be included in the grammar network, with the M sub-networks corresponding to the M environments. This is illustrated in FIG. 1 where three sentence sub-networks are depicted, as required by present state-of-the-art recognizers in order to recognize distinctly three HMM sets. In FIG. 1, each circle represents a node of the grammar which corresponds to a particular symbol referencing a particular single HMM of a particular HMM set, and the lines between nodes represent the transitions between nodes that are allowed by the grammar. It can be seen in FIG. 1 that for the three HMM sets there exist three sub-networks of nodes, where each of the three sub-networks have the same structure.

In accordance with the present invention, a generic base grammar network that is environment-independent having the size of a single sub-network is constructed to represent the structure of the M sub-networks. In the preferred embodiment for the case of male and female HMM sets, the base grammar network would be a representation of the structure of the male and female sub-networks but would be gender-independent. It should be understood that the present invention is not limited to male and female HMM sets. HMM model sets for children or any other environments may also be included. In the preferred embodiment, in order for the recognizer to develop high probability paths allowed by the grammar using HMMs from both male and female HMM sets, the symbols from the generic base grammar must be expanded into the corresponding male and female symbols referencing the male and female HMM sets. This requires the recognizer to construct paths that would occur in a grammar network consisting of the male and female sub-networks by using the base grammar network as an example of the sub-network grammar structure for both the male and female HMM sets.

In the applicant's method of decoding M HMM sets, two types of symbols are distinguished:

Base-symbols: Symbols representing the nodes of the generic base speaker-independent grammar network. To each of the base-symbols there correspond M expanded-symbols which represent the symbols of conceptual sub-networks. Base-symbols and the base grammar network have physical memory space allocated for storage of the representation of the base-symbols, the nodes of the base grammar, and the transitions between nodes.

Expanded-symbols: Symbols representing the expanded grammar network nodes that reference the HMMs from each HMM set. The expanded-symbols are used to construct a conceptual expanded grammar network that simulates the characteristics of an M sub-network grammar. Since the expanded grammar network is only conceptual, it does not require storage for symbol information, grammar nodes, or transitions. The expanded-symbols may reference, for example, HMMs from the male and female HMM sets.

The new recognizer builds recognition paths defined on the expanded-symbols, and accesses the network using base-symbols, through a conversion function that provides the base-symbol of any expanded-symbol, or the expanded-symbols for a given base-symbol.

Figure 2:
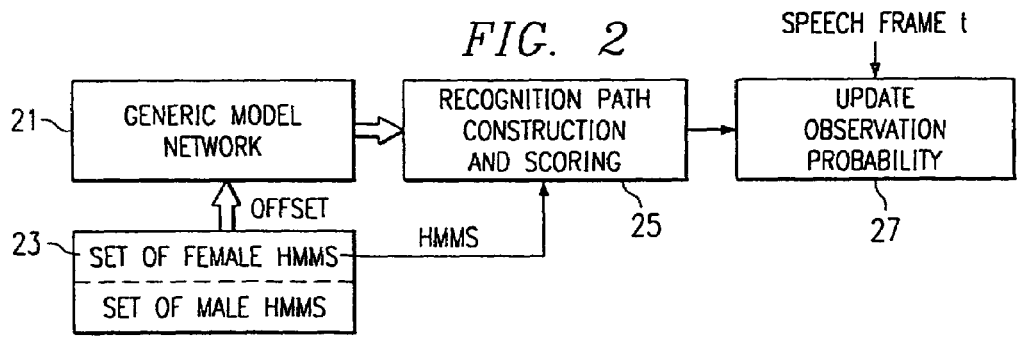
FIG. 2 illustrates a block diagram of the speech recognition path probability scoring process according to one embodiment of the present invention.

Referring to FIG. 2 there is illustrated the speech recognition path construction and path probability scoring process according to one embodiment of the present invention. For the male and female case, the generic base grammar network, including the node and transition structure and information of the base-symbols is stored in memory 21. Memory 23 holds the sets of male HMMs and female HMMs. As is well known in the art, speech recognizers process short sequential portions of speech, referred to as frames. As is also well known, for each incoming speech frame, the speech recognizer must determine which HMMs should be used to construct high probability paths through the grammar network.

Figure 3:
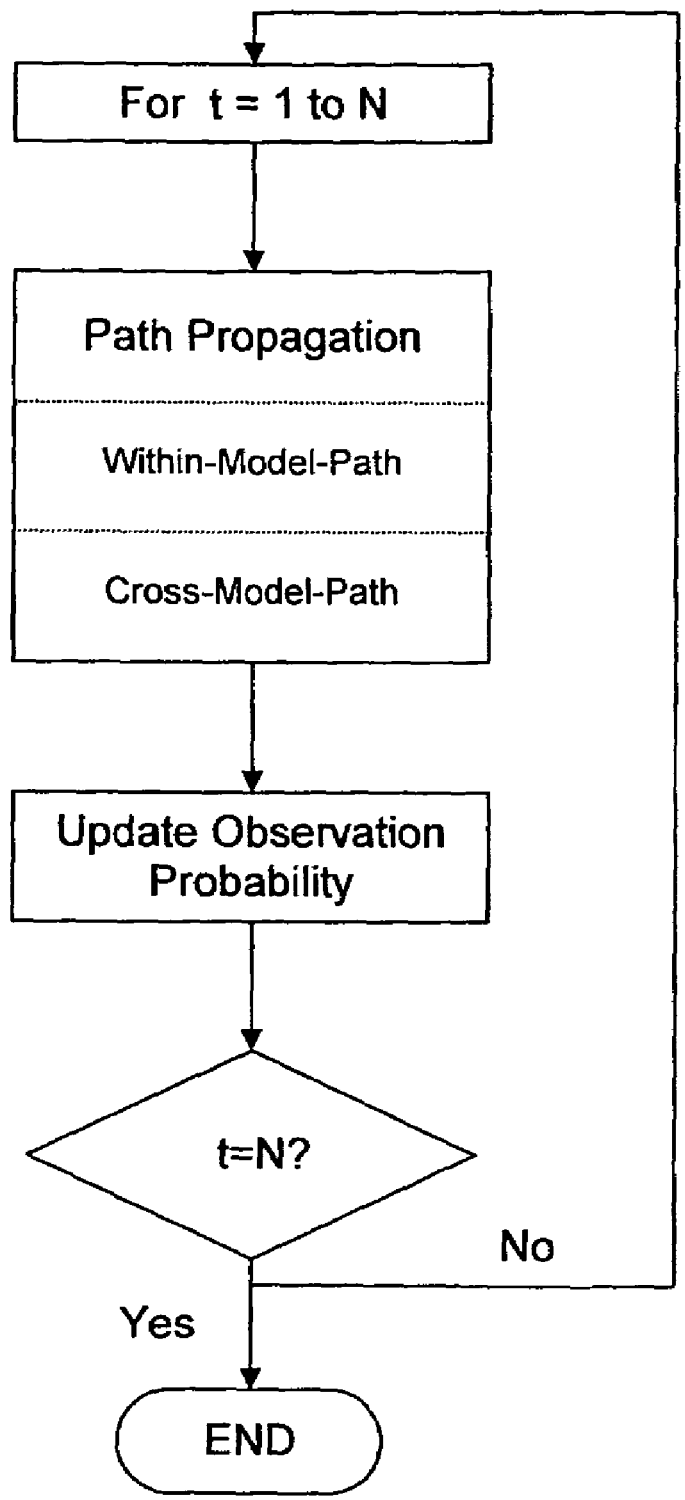
FIG. 3 illustrates the main loop procedure of the speech recognition path probability scoring process.

In the present invention, the construction of the paths occurs iteratively for each incoming speech frame of an utterance, as shown in FIG. 3 which illustrates the MAIN-LOOP procedure of the recognizer. As seen in FIG. 3, for each incoming speech frame, the MAIN-LOOP procedure first executes a PATH-PROPAGATION procedure to extend the path. The PATH-PROPAGATION procedure implements the path construction and scoring process (FIG. 2, 25) which uses the base grammar network and base-symbol information in memory 21, the HMM model set information in memory 23, and a conversion function to identify the expanded-symbols to be used to extend the recognition paths through the conceptual expanded grammar network. After the path construction is accomplished the MAIN-LOOP procedure (FIG. 3) implements the UPDATE-OBSERVATION-PROBABILITY process (FIG. 2, 27) of each of the conceptual expanded grammar network paths in which the input speech frame is compared with state acoustic parameter information within each HMM corresponding to each expanded-symbol active on a conceptual expanded grammar path, and the resulting probability for each path is maintained as part of the path information. After the speech recognizer performs the MAIN-LOOP procedure for all utterance frames, the recognizer then selects the remaining path that has the highest final probability as the path containing the recognized utterance.

Since speech frames associated with paths through each expanded-symbol are further associated with a sequence of HMM states of the HMM referenced by the expanded-symbol, paths through the conceptual expanded grammar network consist of a sequence of both expanded-symbols and HMM states. Consequently, for a given utterance frame, a path can be extended either within the presently active HMM referred to by an active expanded-symbol using a WITHIN-MODEL-PATH procedure or to another expanded-symbol and it's referenced HMM using a CROSS-MODEL-PATH procedure. This is the task of the PATH-PROPAGATION procedure. The PATH-PROPAGATION procedure of this invention first determines the HMM and base-symbol corresponding to each active expanded-symbol. In order to do this, the recognizer of this invention utilizes a novel conversion function which accepts as input an expanded-symbol and provides both the HMM and the base-symbol of the generic base grammar network corresponding to the expanded-symbol. The PATH-PROPAGATION procedure then extends the path of each active expanded-symbol within the expanded-symbol's corresponding HMM using the WITHIN-MODEL-PATH procedure.

The WITHIN-MODEL-PATH procedure determines which states of each HMM corresponding to a present active path can be extended to states within the same HMM, and then extends the paths to create an updated set of active paths. This procedure is typical of present art HMM-based recognizers.

After PATH-PROPAGATION extends the paths within the HMMs, it determines if the active paths can be extended to other HMMs referenced by other expanded-symbols using the CROSS-MODEL-PATH procedure. The CROSS-MODEL-PATH procedure extends each active path to new expanded-symbols and their referenced HMMs. To do this, for each active expanded-symbol, the procedure determines the corresponding base-symbol by using the novel conversion function. The base-symbol and base grammar network are used to determine which new base-symbols may be extended as dictated by the constraint of the base grammar network. Then, for each of the new base-symbols, the associated expanded-symbol corresponding to the same HMM set as the active expanded-symbol is used to extend the path to the new expanded-symbols and their referenced HMMs. Note that the CROSS-MODEL-PATH procedure ensures that extension of any path will only occur within an HMM set so that the recognizer correctly conceptually separates the paths to simulate the M sub-networks.

After the MAIN-LOOP completes path extension, the path acoustic likelihood score is included in the path information. This is performed by the UPDATE-OBSERVATION-PROB procedure (FIG. 2, 27). In UPDATE-OBSERVATION-PROB, the acoustic likelihood is calculated for each state of each HMM corresponding to each active expanded-symbol for which there is present active path information. The acoustic likelihood is determined by evaluating the likelihood of the present frame of acoustic data given the model acoustic information of the HMM state. This procedure is similar to present-art HMM recognizers, except that the present invention uses the novel conversion function to find the HMM within each HMM set corresponding to each active expanded-symbol.

The invention claimed is:

1. A speech recognizer comprising:
   means for receiving speech frames;
   means for constructing recognition paths for the speech frames, wherein the recognition paths are defined on expanded-symbols wherein each expanded-symbol references a model contained in one of a plurality of model sets, wherein each model set of the plurality of model sets is a group of models from one acoustic environment;
   means for determining expanded-symbols by a conversion function that maps a base-symbol of a generic base grammar network composed of base-symbols to a plurality of expanded-symbols and an expanded-symbol to its corresponding base-symbol; and
   means for selecting recognition paths of the constructed recognition paths as containing recognized utterances.

2. The recognizer of claim 1 wherein said recognition path construction includes means for constraining each recognition path to expanded-symbols referencing models within one model set.

3. The recognizer of claim 1 wherein the model sets are HMM models.

4. The recognizer of claim 1 wherein the models of each set correspond to a single environmental factor.

5. The recognizer of claim 1 wherein the recognition procedure consists of a recognition path construction procedure and an update observation probability procedure.

6. The recognition path construction procedure of claim 5 wherein construction of recognition paths consists of extending the path, wherein the path defined by a present expanded-symbol and its referenced model is extended within the referenced model by a within-model-path procedure and to additional expanded-symbols by a cross-model-path procedure.

7. The cross-model-path procedure of claim 6 in which the path from a present expanded-symbol is extended to additional expanded-symbols by determining the present base-symbol corresponding to the present expanded-symbol, determining which additional base-symbols may follow the present-base symbol according to the generic base grammar network, and determining the additional expanded-symbols using the conversion function which maps each additional base-symbol of the generic base grammar network to a plurality of additional expanded-symbols.

8. The update observation probability procedure of claim 5 in which the probability of speech is included in the extended recognition paths for each of the models corresponding to expanded-symbols on the recognition paths.

* * * * *